United States Patent
Giamati et al.

(10) Patent No.: US 10,308,088 B2
(45) Date of Patent: Jun. 4, 2019

(54) MECHANICAL DOWN-STOP FOR AXLE/SUSPENSION SYSTEMS

(71) Applicant: Hendrickson USA, L.L.C., Itasca, IL (US)

(72) Inventors: Nicholas J. Giamati, Akron, OH (US); Jacob D. Andreasen, Akron, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 69 days.

(21) Appl. No.: 15/690,341

(22) Filed: Aug. 30, 2017

(65) Prior Publication Data

US 2019/0061449 A1 Feb. 28, 2019

(51) Int. Cl.
*B60G 9/00* (2006.01)
*B60G 3/06* (2006.01)

(52) U.S. Cl.
CPC .............. *B60G 3/06* (2013.01); *B60G 9/003* (2013.01); *B60G 2200/31* (2013.01); *B60G 2204/41* (2013.01); *B60G 2204/4504* (2013.01)

(58) Field of Classification Search
CPC .............. B60G 3/06; B60G 2204/4504; B60G 2204/41; B60G 9/003; B60G 2200/31
See application file for complete search history.

(56) References Cited

U.S. PATENT DOCUMENTS

| 2,993,705 | A |   | 7/1961  | D'Avigdor |                         |
|-----------|---|---|---------|-----------|-------------------------|
| 3,075,787 | A |   | 1/1963  | Mineck    |                         |
| 3,340,946 | A | * | 9/1967  | Whitehead | B62D 61/125 180/24.02   |
| 3,512,802 | A | * | 5/1970  | La Rock, Jr. | B60G 17/052 280/407.1 |
| 3,771,812 | A | * | 11/1973 | Pierce    | B62D 61/125 180/24.02   |
| 3,915,470 | A | * | 10/1975 | Jansen    | B62D 61/125 180/24.02   |
| 4,763,953 | A | * | 8/1988  | Chalin    | B60G 5/04 280/124.116   |
| 4,786,035 | A |   | 11/1988 | Elliott   |                         |
| 5,171,036 | A |   | 12/1992 | Ross      |                         |

(Continued)

FOREIGN PATENT DOCUMENTS

EP 1792758 A1 6/2007
FR 2945982 A1 12/2010

(Continued)

OTHER PUBLICATIONS

"Surelok, Dock solutions for safer, more efficient dock operations"; 2016; Hendrickson USA, L.L.C.; Product Brochure L622 Rev J 02-16; pp. 1-2.

*Primary Examiner* — Karen Beck
(74) *Attorney, Agent, or Firm* — Dureska & Moore, LLC; David P. Dureska; David J. Danko

(57) ABSTRACT

A mechanical down-stop for heavy-duty vehicle axle/suspension systems which includes an angled bracket that is rigidly/stiffly attached to the vehicle frame at one end, and is attached to a flexible portion of the mechanical down-stop at its other end. The flexible portion is attached to a beam of the axle/suspension system. The angled bracket is formed of an elastically deformable material and includes a bend that enables the bracket to act as a spring. The angled bracket and the flexible portion limit downward movement and react the downward force of the beam.

17 Claims, 5 Drawing Sheets

(56) References Cited

U.S. PATENT DOCUMENTS

| | | | |
|---|---|---|---|
| 5,536,036 A | 7/1996 | Ehrlich | |
| 6,003,885 A * | 12/1999 | Richardson | B62D 61/12 280/86.5 |
| 6,257,597 B1 | 7/2001 | Galazin | |
| 6,439,587 B2 | 8/2002 | Fabris | |
| 6,752,406 B2 * | 6/2004 | Pierce | B60G 9/003 280/124.162 |
| 8,459,666 B2 * | 6/2013 | Piehl | B60G 9/003 280/86.5 |
| 8,851,492 B2 | 10/2014 | Andreasen et al. | |
| 10,150,399 B2 * | 12/2018 | Kangas | B60G 7/001 |
| 2001/0038188 A1 * | 11/2001 | Fabris | B60G 7/04 280/124.11 |
| 2014/0197615 A1 * | 7/2014 | Boler | B60G 9/003 280/124.116 |

FOREIGN PATENT DOCUMENTS

| | | |
|---|---|---|
| GB | 224555 A | 2/1925 |
| WO | 9528312 A2 | 10/1995 |

* cited by examiner

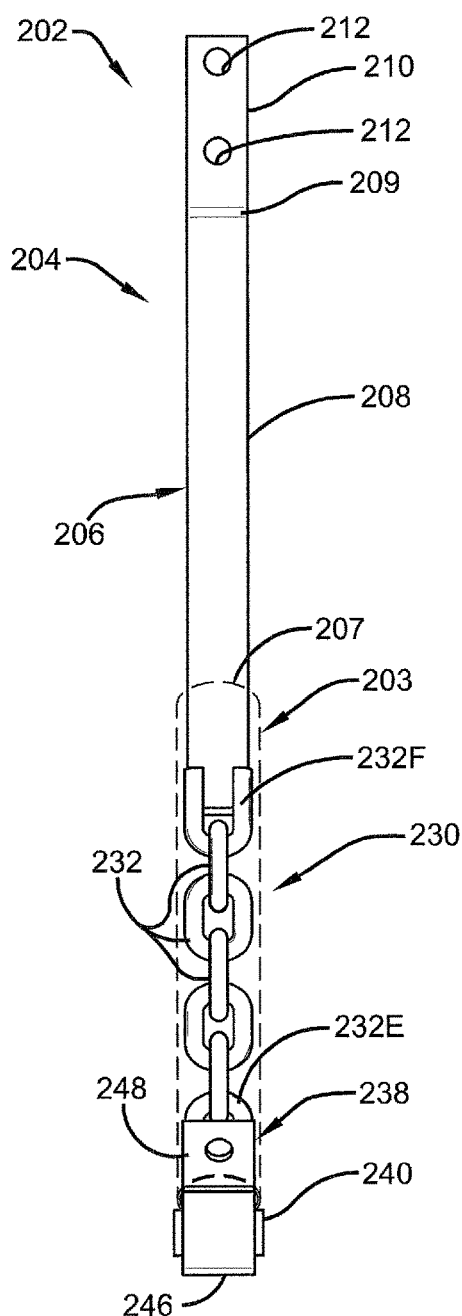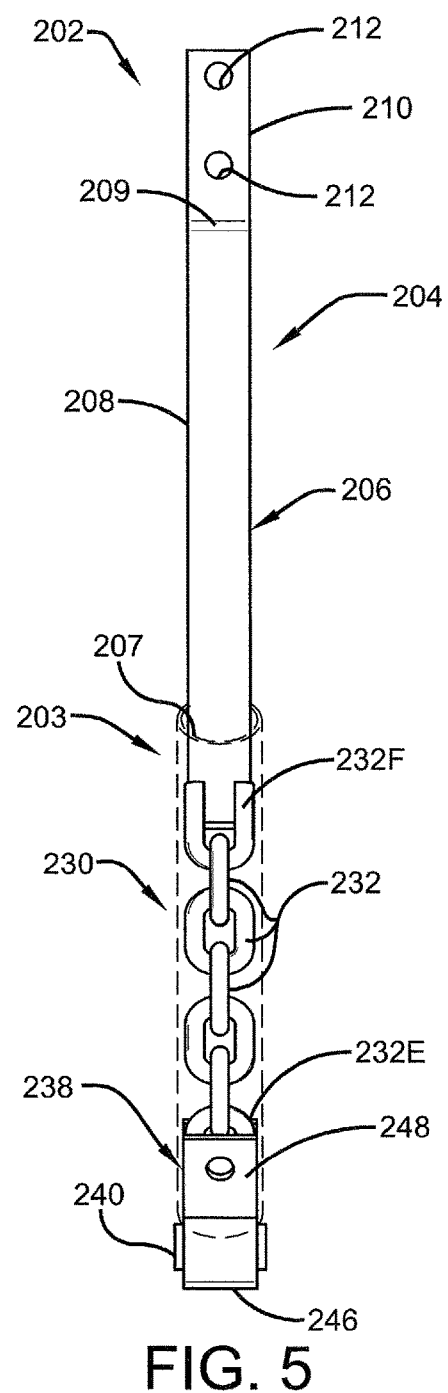

MECHANICAL DOWN-STOP FOR AXLE/SUSPENSION SYSTEMS

BACKGROUND OF THE INVENTION

Technical Field

The invention relates generally to the art of axle/suspension systems for heavy-duty vehicles. More particularly, the invention relates to air-ride axle/suspension systems for heavy-duty vehicles which utilize an air spring to cushion the ride of the vehicle. More specifically, the invention relates to a mechanical down-stop for use with heavy-duty vehicle air-ride axle/suspension systems that includes a generally L-shaped or angled bracket utilized to provide rigid/stiff attachment of the mechanical down-stop to the vehicle frame, and a flexible interlinked portion for attachment of the down-stop to the axle/suspension system beam. The angled bracket is formed of an elastically deformable material and includes a bend that enables the bracket to act as a spring, which in combination with the rigid attachment of the mechanical down-stop to the vehicle frame, provides a stronger and more compliant mechanical down-stop that minimizes potential for malfunction of the down-stop during operation of the vehicle. In addition, the mechanical down-stop of the present invention reduces vehicle weight and manufacturing costs and complexity by eliminating a clevis-type mounting bracket and the associated connector, and by reducing the number of links required to limit the downward movement of the beam of the axle/suspension system to minimize potential damage to the air spring and/or other components of the axle/suspension system during operation of the vehicle.

Background Art

The use of air-ride trailing arm and leading arm beam-type axle/suspension systems has been very popular in heavy-duty vehicles for many years. Heavy-duty vehicles include heavy-duty trucks, trailers, tractor-trailers, and/or semi-trailers, and trailers thereof. When reference is made herein to heavy-duty vehicles, it is with the understanding that such reference includes trucks, trailers, tractor-trailers, and/or semi-trailers, and trailers thereof. Although air-ride trailing arm and leading arm beam-type axle/suspension systems can be found in widely varying structural forms, in general their structure is similar in that each axle/suspension system typically includes a pair of suspension assemblies. In some heavy-duty vehicles, the suspension assemblies are connected directly to the primary frame of the vehicle. In other heavy-duty vehicles, the primary frame of the vehicle supports a subframe, and the suspension assemblies connect directly to the subframe. For those heavy-duty vehicles that support a subframe, the subframe can be non-movable or movable, the latter being commonly referred to as a slider box, slider subframe, slider undercarriage, or secondary slider frame. For the purpose of convenience and clarity, reference herein will be made to main members and/or cross members, with the understanding that such reference is by way of example, and that the present invention applies to heavy-duty vehicle axle/suspension systems suspended from main members and/or cross members of primary frames, movable subframes and non-movable subframes.

Typically, each suspension assembly of an air-ride beam-type axle/suspension system includes a longitudinally extending elongated beam. Each beam typically is located adjacent to and below a respective one of a pair of spaced-apart longitudinally extending main members and one or more cross members which form the frame of the vehicle. More specifically, each beam is pivotally connected at one of its ends to a hanger which in turn is attached to and depends from a respective one of the main members of the vehicle. An axle extends transversely between and typically is connected by some means to the beams of the pair of suspension assemblies at a selected location from about the mid-point of each beam to the end of the beam opposite from its pivotal connection end. The beam end opposite the pivotal connection end also is connected to an air spring, or its equivalent, which in turn is connected to a respective one of the main members. A height control valve is mounted on the main member or other support structure and is operatively connected to the beam and to the air spring in order to maintain the ride height of the vehicle. A brake system and one or more shock absorbers for providing damping to the axle/suspension system of the vehicle are also mounted on the axle/suspension system. In some applications, the air spring may provide some or all of the damping to the axle/suspension system. The beam may extend rearwardly or frontwardly from the pivotal connection relative to the front of the vehicle, thus defining what are typically referred to as trailing arm or leading arm axle/suspension systems, respectively. However, for purposes of the description contained herein, it is understood that the term "trailing arm" will encompass beams which extend either rearwardly or frontwardly with respect to the front end of the vehicle.

The axle/suspension systems of the heavy-duty vehicle act to cushion the ride, dampen vibrations and stabilize the vehicle. More particularly, as the vehicle is traveling over the road, its wheels encounter road conditions that impart various forces, loads, and/or stresses, collectively referred to herein as forces, to the respective axle on which the wheels are mounted, and in turn, to the suspension assemblies that are connected to and support the axle. In order to minimize the detrimental effect of these forces on the vehicle as it is operating, the axle/suspension system is designed to react and/or absorb at least some of them.

These forces include vertical forces caused by vertical movement of the wheels as they encounter certain road conditions, fore-aft forces caused by acceleration and deceleration of the vehicle, and side-load and torsional forces associated with transverse vehicle movement, such as turning of the vehicle and lane-change maneuvers. In order to address such disparate forces, axle/suspension systems have differing structural requirements. More particularly, it is desirable for an axle/suspension system to be fairly stiff in order to minimize the amount of sway experienced by the vehicle and thus provide what is known in the art as roll stability. However, it is also desirable for an axle/suspension system to be relatively flexible to assist in cushioning the vehicle from vertical impacts, and to provide compliance so that the components of the axle/suspension system resist failure, thereby increasing durability of the axle/suspension system. It is also desirable to dampen the vibrations or oscillations that result from such forces.

A key component of the axle/suspension system that cushions the ride of the vehicle from vertical impacts is the air spring. Conventional air springs utilized in heavy-duty air-ride axle/suspension systems are typically characterized as either non-damping or damping air springs. Prior art non-damping air springs, while providing cushioning to the vehicle cargo and occupant(s) during operation of the vehicle, provide little, if any, damping characteristics to the axle/suspension system, as is known in the art. In axle/suspension systems that utilize non-damping air springs, damping characteristics are instead typically provided to the axle/suspension system via one or more hydraulic shock absorbers. Each one of the shock absorbers is mounted on and extends between the beam of a respective one of the suspension assemblies of the axle/suspension system and a respective one of the main members, hangers, or a cross member extending transversely between the main members of the vehicle frame. Although shock absorbers provide damping to the axle/suspension system, they add complexity and weight to the axle/suspension system. Moreover, because the shock absorbers are a service item of the axle/suspension system that will require maintenance and/or replacement from time to time, they also add additional maintenance and/or replacement costs to the axle/suspension system.

Prior art shock absorbers, while providing damping characteristics, also limit the downward movement of the beam of the axle/suspension system, minimizing the possibility of damage to the air spring and/or to other components of the axle/suspension system. For example, when a trailer is lifted onto a railroad car, the prior art shock absorber limits downward movement of the beam of the axle/suspension system, which if not limited could potentially result in damage to the air spring and axle/suspension system. In an alternate application, the prior art shock absorber prevents the beam of the axle/suspension system from overextending downwardly when the vehicle is being reversed. In this scenario, the vehicle brakes are actuated and cause the axle/suspension system to extend downwardly, called "reverse braking" in the art. In another application, one or both suspension assemblies of the axle/suspension system suddenly drops, or moves downwardly, as a result of a pothole, or other obstacle encountered during vehicle operation. The prior art shock absorber serves as a stop to limit the downward movement of the beam of the axle/suspension system. The limited movement of the beam of the axle/suspension system minimizes the possibility of potential damage to the air spring and/or other components of the axle/suspension system.

In order to eliminate the need for shock absorbers to provide damping to the heavy-duty vehicle axle/suspension system, air springs with damping characteristics, or damping air springs, such as the one shown and described in U.S. Pat. No. 8,540,222, and owned by the Assignee of the instant application, Hendrickson USA, L.L.C., have been utilized. A damping air spring is generally similar in structure to a non-damping air spring, except that the damping air spring includes a means to provide damping to the axle/suspension system, and thus the heavy-duty vehicle, as is known in the art. Because such air springs provide damping characteristics to the axle/suspension system, and thus the heavy-duty vehicle, the damping shock absorber can be eliminated, thus reducing complexity, saving weight and cost, and allowing the heavy-duty vehicle to haul more cargo. Because such prior art damping shock absorbers limit downward movement of the axle/suspension system beams, elimination of the prior art shock absorber may potentially lead to issues with downward movement of the axle/suspension system. More specifically, the air spring and/or other components of the axle/suspension system may be potentially damaged if the beam of the axle/suspension system overextends downwardly as a result of the trailer being lifted onto a railroad car, "reverse braking", and/or if the vehicle encounters a pothole or other obstacle.

In those applications where the shock absorbers have been eliminated, such as with air-ride beam-type axle/suspension systems that include damping air springs, prior art mechanical down-stops have been utilized to limit downward movement of the axle/suspension system beams to minimize potential damage to the air spring and/or other components of the axle/suspension system.

Such prior art mechanical down-stops typically include a plurality of interlinked chain links attached to one another linearly, with at least one connector containing an elastomeric bushing attached to a link at each of a top end and a bottom end of the mechanical down-stop. The bottom end of mechanical down-stop is typically attached to the axle/suspension system beam in a known manner. The connector at the top end of the mechanical down-stop typically is connected to a clevis-type mounting bracket, which in turn is attached to a respective one of the main members, hanger, or a cross member of the vehicle frame via bolts or other suitable fasteners. The mechanical down-stop generally limits the downward movement of the beam of the axle/suspension system and minimizes potential damage to the air spring and/or other components of the axle/suspension system during operation of the vehicle. The elastomeric bushings elastically deform during downward movement of the beam to react downward force during operation of the mechanical down-stop.

While such prior art mechanical down-stops are generally suitable for normal vehicle operation, during repeated extreme downward movement of the beam, such as when the vehicle travels over a large pothole, the connection of the clevis-type bracket to the vehicle frame can potentially become compromised, resulting in malfunction of the mechanical down-stop and damage to the air springs and/or other components of the axle/suspension system. For example, in applications where the clevis-type mounting bracket is attached to a cross member of the vehicle frame, because the clevis-type bracket is typically attached to the cross member on the frontward or rearward facing surface of the cross member, during downward movement of the beam and operation of the prior art mechanical down-stop, when the downward force generated surpasses the force capable of being reacted by the mechanical down-stop, the excess angular downward/rearward or downward/frontward tensile force experienced by the clevis-type mounting bracket can potentially result in the bracket/bolts being pulled out from the cross member, resulting in malfunction of the mechanical down-stop and potential damage to air spring and/or other components of the axle/suspension system. In addition, because of the relatively complex design of prior art mechanical down-stops, including the use of a relatively heavy clevis-type mounting bracket, the use of a pair of connectors, and a plurality of links extending completely between the connectors, prior art mechanical down-stops are relatively heavy, which increases the overall weight of the heavy-duty vehicle and results in decreased fuel economy and increased operating costs. Such prior art mechanical down-stops also are relatively expensive to manufacture due to their complexity and relatively large number of components.

Other types of mechanical down-stops, such as those formed of rope, straps, wire, or the like, also can have similar disadvantages.

Therefore, there is a need in the art for a mechanical down-stop for heavy-duty vehicle axle/suspension systems which provides stronger attachment to the vehicle frame and more compliance to react more of the downward force generated by the beam during downward movement. There is also a need in the art for a mechanical down-stop with decreased complexity to reduce manufacturing costs associated with the mechanical down-stop and reduce vehicle weight and vehicle operating costs. The mechanical down-stop for heavy-duty vehicles of the present invention satisfies those needs and will now be described.

BRIEF SUMMARY OF THE INVENTION

Objectives of the present invention include providing a mechanical down-stop for heavy-duty vehicle axle/suspension systems that limits downward movement of axle/suspension system beams while providing a stronger connection between the mechanical down-stop and the vehicle main members, hangers, or cross members.

Another objective of the present invention is to provide a more compliant mechanical down-stop for heavy-duty vehicle axle/suspension systems.

Yet another objective of the present invention is to provide a mechanical down-stop for heavy-duty vehicles which reduces overall vehicle weight.

Yet another objective of the present invention is to provide a mechanical down-stop for heavy-duty vehicles which reduces manufacturing costs associated with the mechanical down-stop.

These objectives are achieved by the mechanical down-stop of the present invention, which includes a first portion formed of an elastically deformable material, the first portion being rigidly attached to a selected one of a frame, a hanger, or a beam of the heavy-duty vehicle; and a flexible second portion, the second portion being attached to the first portion at a first end and a selected one of the frame, the hanger, or the beam at a second end, the first portion and the second portion limiting downward movement and reacting downward force of the beam, the first portion elastically deforming to react the beam downward force.

BRIEF DESCRIPTION OF THE SEVERAL VIEWS OF THE DRAWINGS

The preferred embodiment of the present invention, illustrative of the best mode in which applicant has contemplated applying the principles, is set forth in the following description and is shown in the drawings.

FIG. 4 is a rear elevational view of the preferred embodiment mechanical down-stop of the present invention shown in FIG. 3;

FIG. 5 is a front elevational view of the preferred embodiment mechanical down-stop of the present invention shown in FIG. 3.

Similar numerals refer to similar components throughout the drawings.

DETAILED DESCRIPTION OF THE INVENTION

Figure 1:
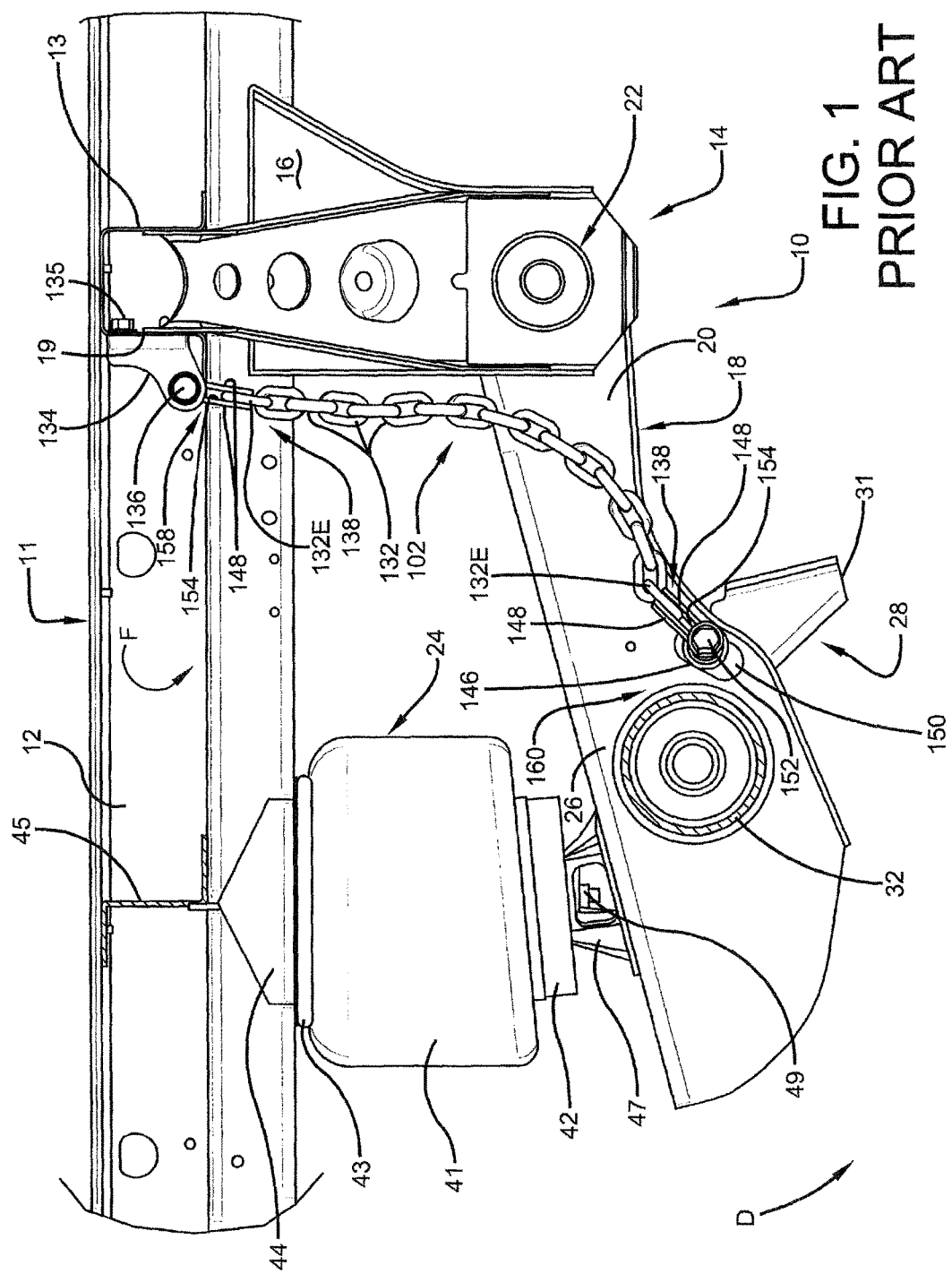
FIG. 1 is a fragmentary side elevational view, with portions in section, of a driver-side suspension assembly of an air-ride beam-type axle/suspension system, viewed in an outboard direction, with a prior art mechanical down-stop attached to a suspension assembly beam and a cross member of the vehicle frame.

In order to better understand the environment in which the mechanical down-stop for air-ride beam-type axle/suspension systems of the present invention is utilized, a trailing arm air-ride beam-type axle/suspension system incorporating a prior art mechanical down-stop 102 is shown in FIG. 1, and is indicated generally at reference numeral 10.

Axle/suspension system 10 includes a pair of generally identical suspension assemblies 14, each suspended from a respective one of a pair of transversely spaced hangers 16. Inasmuch as suspension assemblies 14 and hangers 16 are identical, for purposes of conciseness, only one suspension assembly 14 and one hanger 16 is shown and will be described in detail. Each hanger 16 is secured to and depends from a main member 12 of a frame 11 of the heavy-duty vehicle. Suspension assembly 14 includes a trailing arm beam 18 that is pivotally mounted at a front end 20 to hanger 16 via a bushing assembly 22 in a known manner. An axle 32 extends transversely between and is captured by each beam 18 in a known manner. One or more wheels (not shown) are mounted on each end of axle 32 in a known manner. For the sake of relative completeness, a brake air chamber bracket 31 of an air brake system 28 is shown attached to beam 18.

An air spring 24 is suitably mounted on the upper surface of a rear end 26 of beam 18 and extends between the beam and main member 12. Air spring 24 is a damping air spring of the type described in U.S. Pat. No. 8,540,222, assigned to applicant of the present invention, Hendrickson USA, L.L.C. Air spring 24 includes a bellows 41 and a piston 42. The top portion of bellows 41 is sealingly engaged with a bellows top plate 43. An air spring mounting plate 44 is mounted on top plate 43 by fasteners (not shown), and is used to mount the top portion of air spring 24 to a cross member 45 attached to and extending transversely between main members 12 of frame 11. Piston 42 is generally cylindrically-shaped and has a generally flat bottom plate (not shown) and a generally flat top plate (not shown). The bottom portion of bellows 41 is sealingly engaged with the piston top plate in a known manner. The piston bottom plate is attached to an air spring mounting bracket 47 via a fastener 49, which in turn is attached to rear end 26 of beam 18 by any suitable means, such as welding or fasteners. The piston top plate is formed with one or more openings (not shown) so that there is fluid communication between piston 42 and bellows 41. Fluid communication of air between piston 42 and bellows 41 during jounce and rebound events of axle/suspension system 10 provides damping to the axle/suspension system, and thus the heavy-duty vehicle, as is known in the art.

With continued reference to FIG. 1, prior art mechanical down-stop 102 is shown incorporated into axle/suspension system 10. Prior art mechanical down-stop 102 is of the type described in U.S. Pat. No. 8,851,492, assigned to applicant of the present invention, Hendrickson USA, L.L.C. Prior art mechanical down-stop 102 includes a plurality of interlocking chain links 132 and a pair of generally U-shaped connectors 138, with each one of the U-shaped connectors being attached to a respective end link 132E of the links.

Inasmuch as prior art mechanical down-stop 102 includes a pair of U-shaped connectors 138, only one of the U-shaped connectors will be described below, with the understanding that a generally identical U-shaped connector is attached to the opposite end of the mechanical down-stop.

U-shaped connector 138 includes a generally semi-circular portion 146 and a pair of generally elongated spaced-apart parallel portions 148. Elongated portions 148 extend from semi-circular portion 146 so that a space 154 is created between the elongated portions. End link 132E of prior art mechanical down-stop 102 is centrally disposed into space 154 between elongated portions 148 of U-shaped connector 138 and is attached therein by a rigid means of attachment, such as welds or other fastening means.

An elastomeric bushing (not shown) is disposed within semi-circular portion 146 of U-shaped connector 138. The elastomeric bushing is generally press-fit into semi-circular portion 146 of U-shaped connector 138 and generally extends outwardly from the U-shaped connector. The elastomeric bushing is generally cylindrically shaped and is typically composed of rubber, but can include other elastomeric compositions or some other member of compliance. The elastomeric bushing includes a continuous centrally-formed opening (not shown). A cylindrical inner sleeve (not shown) is disposed in the elastomeric bushing opening by press fit or other connection types, such as an adhesive. The inner sleeve facilitates connection of prior art mechanical down-stop 102 to suspension assembly 14 of axle/suspension system 10, as will be described below.

A top end 158 of mechanical down-stop 102 is connected to a cross member 13 of frame 11 utilizing a clevis-type mounting bracket 134. Clevis-type mounting bracket 134 is rigidly attached to a rearward facing surface 19 of cross member 13 by bolts 135. A fastener 136 is utilized to attach U-shaped connector 138 of prior art mechanical down-stop 102 to clevis-type mounting bracket 134. More specifically, fastener 136 is disposed through respective aligned openings (not shown) formed in clevis-type mounting bracket 134 and the opening formed in the inner sleeve of U-shaped connector 138.

A bottom end 160 of prior art mechanical down-stop 102 is rigidly attached to rear end 26 of beam 18 adjacent to axle 32 utilizing a mounting bracket 150 and a bolt 152, or by other similar means of rigid attachment. Bolt 152 attaches U-shaped connector 138 of bottom end 160 to mounting bracket 150. More specifically, bolt 152 is disposed through the respective opening formed in the inner sleeve of U-shaped connector 138, through an opening (not shown) formed in mounting bracket 150, and through an opening (not shown) formed in beam 18.

Having described the structure of prior art mechanical down-stop 102, the operation of the mechanical down-stop will now be described. When beam 18 of suspension assembly 14 of axle/suspension system 10 moves downwardly, such as when the vehicle travels over a large pothole, plurality of links 132 of prior art mechanical down-stop 102 fully extend, limiting the downward movement of the beam and preventing air spring 24 from overextending to minimize the possibility of damage to the air spring and/or other components of the axle/suspension system. Once fully extended, prior art mechanical down-stop 102 reacts the downward force of beam 18 via U-shaped connectors 138. More specifically, as beam 18 moves downwardly, end link 132E of bottom end 160 pulls against the end link of top end 158 and the respective elastomeric bushings generally encircled by the respective U-shaped connectors 138. Each respective elastomeric bushing of U-shaped connectors 138 temporarily deforms to react the beam downward force prior to transfer of the force to cross member 13 and beam 18 to prevent isolation of the force reaction to plurality of links 132, and thus prevent the links from separating and/or causing damage to clevis-type mounting bracket 134, mounting bracket 150, beam 18, or cross member 13.

While prior art mechanical down-stop 102 is generally suitable for normal vehicle operation, during repeated extreme downward movement of beam 18, such as when the vehicle travels over a large pothole, the connection of clevis-type mounting bracket 134 to cross member 13 can potentially become compromised, resulting in malfunction of the mechanical down-stop and damage to air spring 24 and/or other components of axle/suspension system 10. More specifically, because clevis-type mounting bracket 134 is attached to cross member 13 on rearward facing surface 19 of the cross member, during downward movement generally in a direction D of beam 18, and subsequent operation of prior art mechanical down-stop 102 in limiting downward movement of the beam, when the downward force generated by the beam surpasses the force capable of being reacted by the elastomeric bushings of U-shaped connectors 138, the excess force is predominantly applied to clevis-type mounting bracket 134 as an angular downward/rearward tensile force F in a direction away from the cross member. The angular downward/rearward tensile force F experienced by clevis-type mounting bracket 134, over time, can potentially result in bolts 135 being pulled out from cross member 13, resulting in malfunction of prior art mechanical down-stop 102 and damage to air spring 24, other components of suspension assembly 14, and/or frame cross member 13. In addition, because of the relatively complex design of prior art mechanical down-stop 102, including the use of the relatively heavy clevis-type mounting bracket 134, the use of a pair of U-shaped connectors 138, and plurality of links 132 extending completely between the U-shaped connectors, the mechanical down-stop is relatively heavy and complex with many parts, which increases the overall weight of the heavy-duty vehicle and results in decreased fuel economy and increased operating costs, as well as increased manufacturing costs. The mechanical down-stop of the present invention overcomes these drawbacks, and will now be described.

Figure 2:
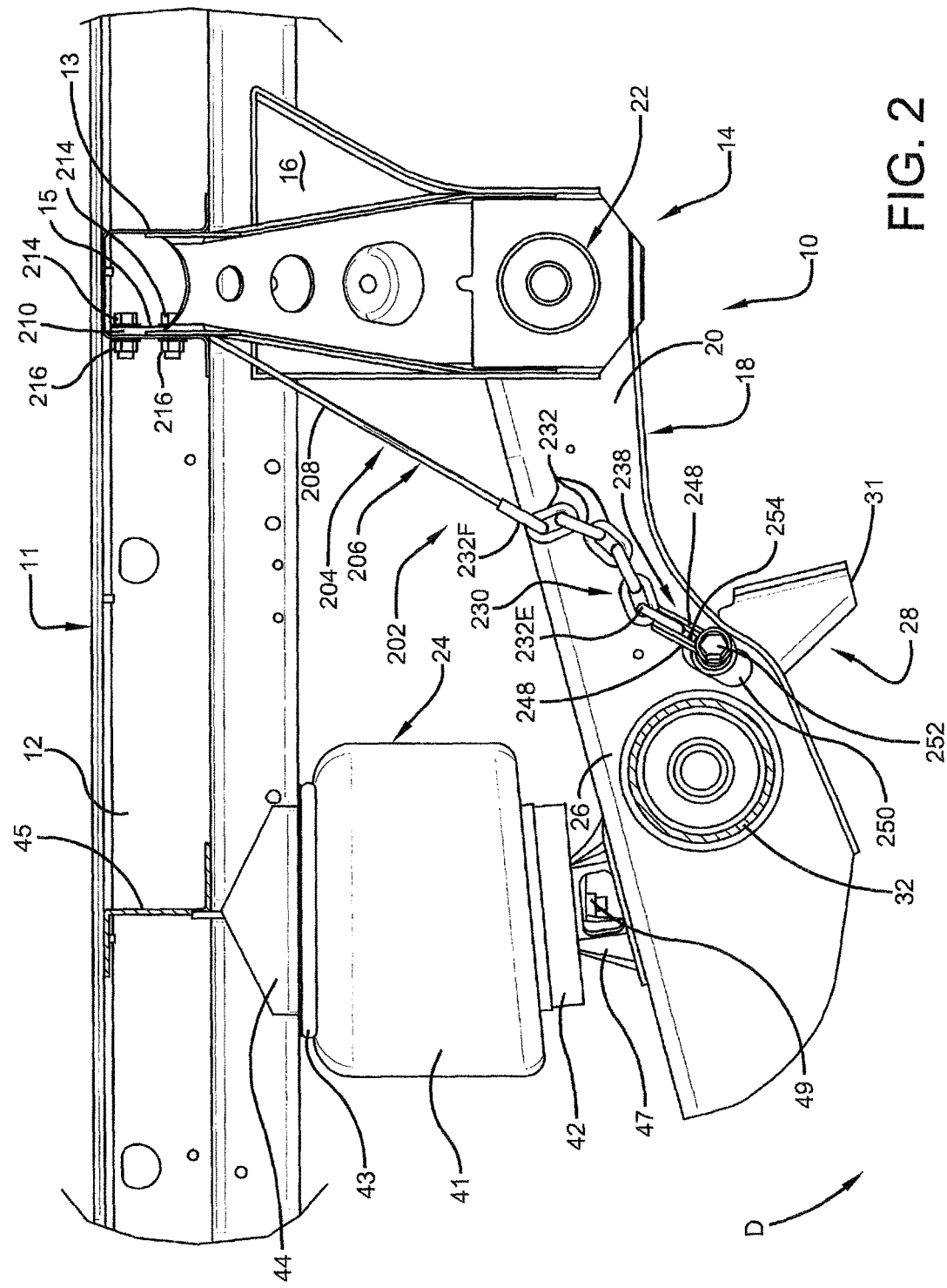
FIG. 2 is a fragmentary side elevational view, with portions in section, of a driver-side suspension assembly of an air-ride beam-type axle/suspension system, viewed in an outboard direction, with a preferred embodiment mechanical down-stop of the present invention attached to a suspension assembly beam and a cross member of the vehicle frame.

With reference to FIG. 2, a preferred embodiment mechanical down-stop of the present invention is shown incorporated into axle/suspension system 10, and is indicated generally at 202. Preferred embodiment mechanical down-stop 202 includes a top portion 204 and a bottom portion 230. Bottom portion 230 of mechanical down-stop 202 generally includes a plurality of interlinking chain links 232 and a U-shaped connector 238.

U-shaped connector 238 is generally similar in structure and function to U-shaped connector 138 of prior art mechanical down-stop 102. With reference to FIGS. 3-6, U-shaped connector 238 includes a generally semi-circular portion 246 and a pair of generally elongated spaced-apart parallel portions 248. Elongated portions 248 extend from semi-circular portion 246 so that a space 254 is created between the elongated portions. A bottom end link 232E of plurality of links 232 is centrally disposed into space 254 between elongated portions 248 of U-shaped connector 238, and is attached therein by a suitable rigid means of attachment, such as by welding or other fastening means. Rigid attachment of bottom end link 232E to U-shaped connector 238 generally minimizes and controls the movement tolerance of plurality of links 232.

An elastomeric bushing 240 is disposed within semicircular portion 246 of U-shaped connector 238. More specifically, elastomeric bushing 240 is press-fit into semicircular portion 246 of U-shaped connector 238 and extends outwardly from the U-shaped connector. Elastomeric bushing 240 is generally cylindrically shaped and is preferably composed of rubber, but may include other elastomeric compositions or some other member of compliance, such as a spring. Elastomeric bushing 240 includes a continuous centrally-formed opening 256. A cylindrical inner sleeve 244 is disposed in opening 256 of elastomeric bushing 240, and is attached therein by press fit or other connection types, such as an adhesive. Inner sleeve 244 is formed with an opening 242.

Bottom portion 230 of preferred embodiment mechanical down-stop 202 is rigidly attached to rear end 26 of beam 18 adjacent to axle 32 utilizing a mounting bracket 250 rigidly attached to the beam and a bolt 252, or by other similar means of rigid attachment. More specifically, bolt 252 is disposed through opening 242 formed in inner sleeve 244 of U-shaped connector 238, through an opening (not shown) formed in mounting bracket 250, and through an opening (not shown) formed in beam 18 to connect bottom portion 230 of mechanical down-stop 202 to suspension assembly 14 of axle/suspension system 10.

Plurality of links 232 of bottom portion 230 extend upwardly from U-shaped connector 238 and includes a top end link 232F attached to the top most one of the plurality of links. Top end link 232F is utilized to attach bottom portion 230 to top portion 204 of preferred embodiment mechanical down-stop 202, as will be described in greater detail below.

Figure 6:
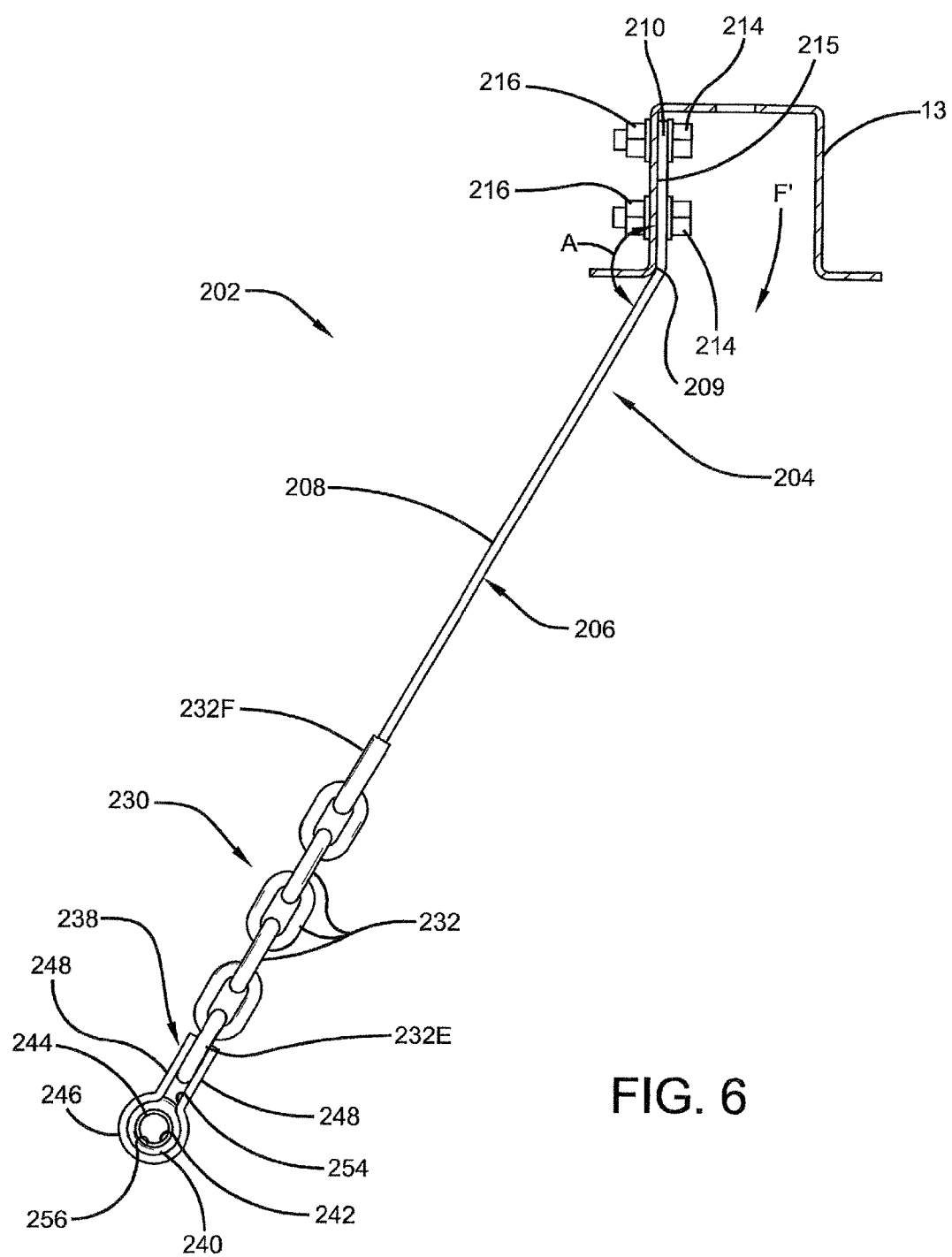
FIG. 6 is a side elevational view of the preferred embodiment mechanical down-stop of the present invention of FIG. 2, shown removed from the suspension assembly and shown attached to the cross member removed from the vehicle frame.

Top portion of 204 of preferred embodiment mechanical down-stop 202 includes a generally L-shaped or angled bracket 206. Angled bracket 206 is formed of an elastically deformable material, such as metal or composite. Angled bracket 206 is formed with a first portion 208 and a second portion 210. Second portion 210 extends upwardly from first portion 208. With particular reference to FIGS. 4-5, second portion 210 is formed with a pair of vertically aligned openings 212, which are utilized to attach mechanical down-stop 202 to cross member 13 of frame 11. With particular reference to FIGS. 2 and 6, second portion 210 of top portion 204 is attached within and to an inner surface 15 of crossbeam 13. More specifically, pair of vertically aligned openings 212 of second portion 210 are aligned with a pair of respective vertically aligned openings (not shown) formed in cross member 13 of frame 11. A pair of bolts 214 are disposed through respective aligned ones of pair of vertically aligned openings 212 and the pair of vertically aligned openings of cross member 13, and are utilized to secure second portion 210 of angled bracket 206 to cross member 13 with nuts 216, providing rigid/stiff attachment of the angled bracket to the cross member. It is to be understood that second portion 210 of angled bracket 206 could include alternative configurations of openings 212 utilized to attach the second portion to inner surface 15 of cross member 13, such as the openings being transversely aligned with a respective pair of transversely aligned openings formed in the cross member, or including a single opening or more than two openings, without affecting the overall concept or operation of the present invention. It is also to be understood that other types of fasteners could be utilized to secure second portion 210 of angled bracket 206 to cross member 13 without affecting the overall concept or operation of the present invention. In addition, it is to be understood that second portion 210 of angled bracket 206 could be rigidly attached to inner surface 15 of cross member 13 without fasteners, such as by welding, without affecting the overall concept or operation of the present invention.

With reference to FIGS. 3-6, first portion 208 of angled bracket 206 is integrally-formed with second portion 210 and extends angularly downwardly/rearwardly from the second portion, forming a bend 209 between the first portion and second portion, the importance of which will be described in detail below. With specific reference to FIGS. 3 and 6, bend 209 includes an angle A between first portion 208 and second portion 210. Angle A of preferred embodiment mechanical down stop 202 is preferably from about ninety degrees to about one hundred eighty degrees.

Top end link 232F of bottom portion 230 is attached to the bottom end of first portion 208 of angled bracket 206 to attach top portion 204 of preferred embodiment mechanical down-stop 202 to bottom portion 230 of the mechanical down-stop. More specifically, top end link 232F is formed with a pair of slots (not shown) which are disposed over the bottom end of first portion 208. Top end link 232F is welded or otherwise rigidly attached to the bottom end of first portion 208. It is to be understood that bottom portion 230 could be attached to angled bracket 206 by alternative means of rigid attachment known in the art without affecting the overall concept or operation of the present invention.

Figure 3:
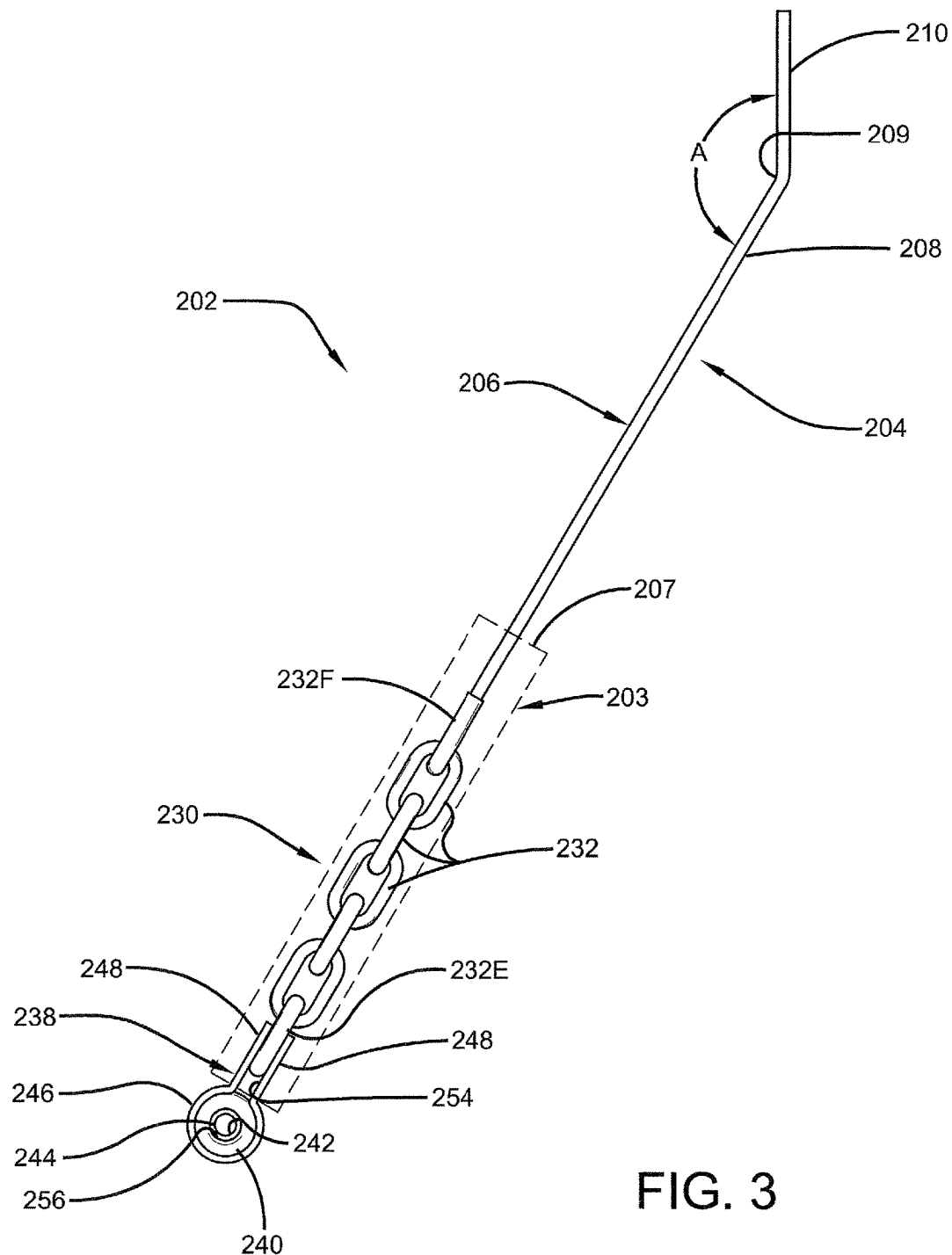
FIG. 3 is a side elevational view of the preferred embodiment mechanical down-stop of the present invention of FIG. 2, removed from the suspension assembly and the vehicle frame, and including an optional sleeve shown as transparent.

With reference to FIGS. 3-5 preferred embodiment mechanical down-stop 202 optionally includes a flexible sleeve 203. Sleeve 203 is composed of a durable material, such as a composite, form-fitting rubberized coating, or other flexible covering. Sleeve 203 is formed with a continuous opening 207 through which plurality of links 232 are disposed to enclose or encase and minimize the movement of the links. Sleeve 203, which may be formed in a single solid piece or may be formed with a seam, is generally cylindrical in shape and extends the length of plurality of links 232 to limit the movement of the links. More specifically, sleeve 203 limits lateral movement, vertical movement, and crimping movement, as well as other potentially detrimental movements, of plurality of links 232. The limited movement of plurality of links 232 in turn minimizes the potential striking of the links against beam 18 of axle/suspension system 10 and prolongs the life of mechanical down-stop 202.

In accordance with an important aspect of the present invention, preferred embodiment mechanical down-stop 202 provides increased compliance compared to prior art mechanical down-stops, such as prior art mechanical down-stop 102. With reference to FIGS. 2 and 6, when beam 18 of suspension assembly 14 moves or pivots downwardly generally in direction D, and from the position shown in FIG. 2, plurality of links 232 of mechanical down-stop 202 fully extend, as illustrated in FIG. 6. Once plurality of links 232 are fully extended, mechanical down-stop 202 reacts the downward force applied to the mechanical down-stop from downward movement of beam 18 and into U-shaped connector 238 and top portion 204. More specifically, as beam 18 continues to travel downwardly, the downward force causes elastomeric bushing 240 of U-shaped connector 238 to elastically deform to react some of the force. Concurrently, as beam 18 continues to travel downwardly, top end link 232F of plurality of links 232 pulls against first portion 208 of angled bracket 206. Because angled bracket 206 is formed of an elastically deformable material and second portion 210 of the angled bracket is rigidly/stiffly attached to cross member 13, first portion 208 elastically deforms relative to second portion 210 and moves towards hanger 16, thereby increasing angle A of bend 209. Because angled bracket 206 is formed of an elastically deformable material, as angle A of bend 209 increases as downward force is applied to first portion 208 of the angled bracket, the angled bracket, and thus top portion 204 of preferred embodiment mechanical down-stop 202, acts as a spring and reacts and distributes some of the downward force of beam 18. In addition, because second portion 210 of angled bracket 206 is rigidly/stiffly attached to cross member 13 in the manner described above, as downward force is applied to first portion 208, the inherent compliance of the cross member further adds to the spring-like action of the angled bracket, providing additional reaction and distribution of the downward force of beam 18. The combination of elastic deformation of elastomeric bushing 240, the spring-like effect of top portion 204 by elastic deformation of angled bracket 206 at bend 209 and the inherent compliance of cross member 13, enables mechanical down-stop 202 to react a greater amount of the downward force generated by beam 18 during downward movement of the beam compared to prior art mechanical down-stops which do not utilize elastomeric bushings, or utilize two elastomeric bushings, thereby providing a more compliant mechanical down-stop which minimizes potential damage to components of the mechanical down-stop, beam 18, cross member 13, and/or mounting bracket 250 during downward movement of beam 18. Links 232 still allow sufficient movement of suspension assembly 14 during operation of the heavy-duty vehicle, movement of beam 18, and axle 32 in various directions.

In accordance with another important aspect of the present invention, preferred embodiment mechanical down-stop 202 provides a stronger connection between the mechanical down-stop and frame 11 as compared to prior art mechanical down-stops, such as prior art mechanical down-stop 102. As previously discussed, prior art mechanical down-stops typically utilize a clevis-type mounting bracket to attach the mechanical down-stop to the vehicle frame or axle/suspension system hanger, such as attachment of prior art mechanical down-stop 102 to cross member 13 of frame 11 with clevis-type mounting bracket 134. With reference to prior art mechanical down-stop 102, clevis-type mounting bracket 134 is attached to rearward facing surface 19 of cross member 13, as described is the disclosure above. During downward movement of beam 18 generally in direction D, when the downward force generated surpasses the force capable of being reacted by prior art mechanical down-stop 102, and in particular its bushings of U-shaped connectors 138, such as from excessive downward movement of the beam when the vehicle travels over a large pothole, the excess force is predominantly applied to clevis-type mounting bracket 134, and in turn bolts 135, as an angular downward/rearward tensile force F (FIG. 1). Over time, the excess angular downward/rearward force F can potentially pull bolts 135, and thus clevis-type mounting bracket 134, out from the cross member 13, resulting in malfunction of prior art mechanical down-stop 102 and potential damage to air spring 24 and/or other components of axle/suspension system 10.

In contrast, and with reference to FIG. 6, because second portion 210 of angled bracket 206 is rigidly/stiffly attached to inner surface 15 of cross member 13, and first portion 208 of the angled bracket extends angularly downwardly/rearwardly from the second portion, as beam 18 of suspension assembly 14 moves downwardly generally in direction D and applies force to mechanical down-stop 202 in excess of that reacted by angled bracket 206 and elastomeric bushing 240, the excess force experienced by the mechanical down-stop is a downward shear force F', as opposed to an angular downward/rearward tensile force F as experienced by prior art mechanical down-stops, such as prior art mechanical down-stop 102 (FIG. 1). More specifically, and with reference to FIG. 6, because second portion 210 is attached to inner surface 15 of cross member 13, the angular downward/rearward tensile force F experienced by the second portion during downward movement D of beam 18 is effectively reacted by inner surface 15 of compliant cross member 13, resulting in a predominantly downward shear force F' on bolts 214 via the second portion. Bolts 214 more effectively react downward shear force F', as compared to an angular downward/rearward tensile force, such as angular downward/rearward tensile force F experienced by clevis-type mounting bracket 134 and bolts 135 of prior art mechanical down-stop 102. This results in a stronger connection between mechanical down-stop 202 and cross member 13 of frame 11, thus minimizing potential for malfunction of the mechanical down-stop and damage to air spring 24 and/or other components of axle/suspension system 10.

In accordance with yet another important aspect of the present invention, preferred embodiment mechanical down-stop 202 of the present invention reduces manufacturing cost of the mechanical down-stop and vehicle weight compared to prior art mechanical down-stops, such as prior art mechanical down-stop 102 (FIG. 1). As previously mentioned, prior art mechanical down-stops, such as prior art mechanical down-stop 102, typically utilize a relatively heavy clevis-type mounting bracket to attach the mechanical down-stop to the vehicle frame, such as clevis-type mounting bracket 134 (FIG. 1). In addition, prior art mechanical down-stops typically utilize a pair of connectors, such as U-shaped connectors 138, to attach the mechanical down-stop to the axle/suspension system beam 18 and clevis-type mounting bracket 134, and typically include a plurality of interlocking chain links 232 extending completely between the connectors.

By employing angled bracket 206 to attach preferred embodiment mechanical down-stop 202 to cross member 13 of frame 11, the preferred embodiment mechanical down-stop eliminates the need to utilize a relatively heavy clevis-type mounting bracket, such as clevis-type mounting bracket 134, to attach the mechanical down-stop to the vehicle frame. Furthermore, because angled bracket 206 is utilized to attach preferred embodiment mechanical down-stop 202 to cross member 13 of frame 11, and is capable of reacting some of the downward force from beam 18 during downward movement D of the beam, the mechanical down-stop eliminates the need to utilize two U-shaped connectors, such as pair of U-shaped connectors 138 utilized with prior art mechanical down-stop 102 (FIG. 1), to react such forces and connect the mechanical down-stop to the vehicle frame. In addition, preferred embodiment mechanical down-stop 202 reduces the number of interlocking chain links 232 required to limit downward movement of beam 18 of suspension assembly 14 to minimize potential damage to air spring 24 and/or other components of axle/suspension system 10 compared to prior art mechanical down-stops, such as prior art mechanical down-stop 102. More specifically, in prior art mechanical down-stop 102, plurality of links 132 extend completely between U-shaped connectors 138, and thus between beam 18 and cross member 13, adding weight and complexity to the down-stop. In contrast, because first portion 208 of angled bracket 206 extends angularly downwardly/rearwardly from the attachment of second portion 210 of the angled bracket to cross member 13, the number of plurality of links 232 sufficient to limit downward movement of beam 18 of suspension assembly 14 to minimize potential damage to air spring 24 and/or other components of axle/suspension system 10 is limited to the amount of links required to provide sufficient movement during jounce, rebound, fore-aft, or side load movement of the beam during vehicle operation. Thus, by eliminating use of a clevis-type mounting bracket, utilizing only a single U-shaped connector 238, and minimizing the number of plurality of links 232 sufficient to limit downward movement of beam 18 of suspension assembly 14 to minimize potential damage to air spring 24 and/or other components of axle/suspension system 10, preferred embodiment mechanical down-stop 202 reduces vehicle weight and thus vehicle fuel consumption and overall operating costs compared to prior art mechanical down-stops. In addition, by eliminating such components, the manufacturing complexity and thus manufacturing costs of preferred embodiment mechanical down-stop 202 are reduced as compared to prior art mechanical down-stops.

It is to be understood that preferred embodiment mechanical down-stop 202 could be utilized with axle/suspension systems with different components and structure than that of axle/suspension system 10, including those with air springs different than air spring 24, without affecting the overall concept or operation of the present invention. It is contemplated that mechanical down-stop 202 could be used with axle/suspension systems with or without shock absorbers and/or with air springs that provide all, some, or no damping. It is also to be understood that second portion 210 of angled bracket 206 of mechanical down-stop 202 could be rigidly attached at other locations on axle/suspension system 10, such as hanger 16, or other portions of frame 11, such as main members 12, and the like, without affecting the overall concept or operation of the present invention. Additionally, it is contemplated that mechanical down-stop 202 can include connection types different than U-shaped connector 238 to connect bottom portion 230 to beam 18, such as a non-bushing connection type, without affecting the overall concept or operation of the present invention. It is also to be understood that plurality of links 232 are shown by way of example and that other structures, such as wire, ropes, straps, or chains with other structure than that shown, could be utilized to attached with preferred embodiment mechanical down-stop 202. It is contemplated that angle A between first portion 208 and second portion 210 of angled bracket 206 could be less than ninety degrees or more than one hundred eighty degrees depending on specific mounting locations of the angled bracket and/or U-shaped connector 238 to frame 11, hanger 16, and/or axle/suspension system 10, or even from less than or equal to ninety degrees to one hundred eighty degrees in a frontward direction, such as with axle/suspension systems with leading arm configurations. It is also contemplated that top portion 204 of mechanical down-stop 202 could include other spring-like structures than that shown and described without affecting the overall concept or operation of the present invention. It is also contemplated that top portion 204 and bottom portion 230 could be formed with other materials than those shown and described without affecting the overall concept or operation of the present invention. In addition, it is contemplated that top portion 204 and bottom portion 230 could be attached to other components of the heavy-duty vehicle and/or axle/suspension system 10, or other components than those shown and described without affecting the overall concept or operation of the present invention. For example, top portion 204 could be rigidly attached to beam 18, and bottom portion 230 in turn attached to inner surface 15 of cross member 13. It also is contemplated that top portion 204 and/or bottom portion 230 could be attached to components of axle/suspension system 10 and/or vehicle frame 11 having some compliant characteristics or no compliance without affecting the overall concept or operation of the present invention.

Accordingly, the mechanical down-stop for axle/suspension systems is simplified, provides an effective, safe, inexpensive and efficient structure which achieves all the enumerated objectives, provides for eliminating difficulties encountered with prior art mechanical down-stops, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the present invention has been described with reference to a specific embodiment. It shall be understood that this illustration is by way of example and not by way of limitation, as the scope of the invention is not limited to the exact details shown or described. Potential modifications and alterations will occur to others upon a reading and understanding of this disclosure, and it is understood that the invention includes all such modifications and alterations and equivalents thereof.

Having now described the features, discoveries and principles of the invention, the manner in which the mechanical down-stop for heavy-duty vehicle axle/suspension systems of the present invention is used and installed, the characteristics of the construction, arrangement and method steps, and the advantageous, new and useful results obtained; the new and useful structures, devices, elements, arrangements, processes, parts and combinations are set forth in the appended claims.

What is claimed is:

1. A down-stop for a heavy-duty vehicle axle/suspension system, said heavy-duty vehicle having a frame and said axle/suspension system having a beam pivotally attached to a hanger depending from said frame, said down-stop comprising:
   a first portion formed of an elastically deformable material including a first end and a second end, said first end of said first portion being rigidly attached to a selected one of the frame, said hanger, or said beam; and
   a flexible second portion including a first end and a second end, said first end of said second portion being directly attached to only said second end of the first portion, said second end of the second portion being attached to a selected one of said frame, the hanger, or the beam, said first portion and said second portion limiting downward movement and reacting downward force of said beam, the first portion elastically deforming to react the beam downward force.

2. The down-stop for a heavy-duty vehicle axle/suspension system of claim 1, wherein said first portion include a bend having an angle, said bend angle increasing when said first portion is elastically deformed to react said beam downward force.

3. The down-stop for a heavy-duty vehicle axle/suspension system of claim 2, wherein said angle is from about ninety degrees to about one hundred eighty degrees.

4. The down-stop for a heavy-duty vehicle axle/suspension system of claim 1, wherein said first end of said first portion is predominantly under a sheer force relative to a selected one of said frame, said hanger, or said beam while reacting the beam downward force.

5. The down-stop for a heavy-duty vehicle axle/suspension system of claim 1, wherein said first portion is formed of a metal or a composite.

6. The down-stop for a heavy-duty vehicle axle/suspension system of claim 1, wherein said flexible second portion is formed of a member selected from the group consisting of rope, strap, and wire.

7. The down-stop for a heavy-duty vehicle axle/suspension system of claim 1, wherein said flexible second portion is formed of a plurality of interlinked chain links.

8. The down-stop for a heavy-duty vehicle axle/suspension system of claim 7, wherein said first end of said flexible second portion is welded to said first portion.

9. The down-stop for a heavy-duty vehicle axle/suspension system of claim 1 further including a connector attached to said second end of said flexible second portion, said connector attaching the second end to a selected one of said frame, said hanger, or said beam.

10. The down-stop for a heavy-duty vehicle axle/suspension system of claim 9, wherein said connector is a U-shaped connector.

11. The down-stop for a heavy-duty vehicle axle/suspension system of claim 10, wherein said U-shaped connector includes a bushing, said bushing being capable of elastically deforming to react said beam downward force.

12. The down-stop for a heavy-duty vehicle axle/suspension system of claim 11, wherein said bushing is formed of an elastomeric material.

13. The down-stop for a heavy-duty vehicle axle/suspension system of claim 11, wherein said bushing is a mechanical spring.

14. The down-stop for a heavy-duty vehicle axle/suspension system of claim 1 further including a sleeve surrounding at least a portion of said down-stop.

15. The down-stop for a heavy-duty vehicle axle/suspension system of claim 14, wherein said sleeve is formed of a member selected from the group consisting of rubber, composite, and a form-fitting coating.

16. The down-stop for a heavy-duty vehicle axle/suspension system of claim 1, wherein said first portion is rigidly attached to an inner surface of a cross member of said frame and said flexible second portion second end is attached to said axle/suspension system beam.

17. The down-stop for a heavy-duty vehicle axle/suspension system of claim 1, wherein said first portion acts as a spring and distributes said beam downward force.

* * * * *